United States Patent Office 3,772,324
Patented Nov. 13, 1973

3,772,324
CERTAIN SUBSTITUTED 1-BENZIMIDAZOLE-CARBOXAMIDES
Stefan Janiak, Basel, and Otto Rohr, Therwil, Switzerland, assignors to Ciba-Geigy AG
No Drawing. Original application Oct. 22, 1968, Ser. No. 769,699, now Patent No. 3,652,580, dated Mar. 28, 1972. Divided and this application Dec. 2, 1971, Ser. No. 204,299
Claims priority, application Switzerland, Oct. 26, 1967, 15,005/67
Int. Cl. C07d 49/38
U.S. Cl. 260—309.2    3 Claims

ABSTRACT OF THE DISCLOSURE

The invention relates to benzimidazolyl derivatives of the general formula

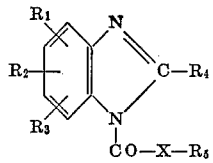

wherein $R_1$, $R_2$ and $R_3$ may be identical or different and each represents hydrogen, halogen, alkyl, alkoxy, alkylthio, alkylSO—, alkylSO$_2$—, —NO$_2$, —CN, CF$_3$, CHO, COOR',

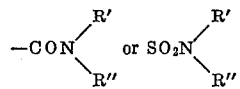

wherein R' and R'' each represents hydrogen or lower alkyl and $R_4$ represents hydrogen or an aliphatic or cycloaliphatic residue, X=O, S, —NH— or N-alkyl and $R_5$ represents an aliphatic, araliphatic or aromatic residue.

These new compounds are very effective as ingredients in bicidal preparations for plant-protection and combating insects, acarides, nematodes, endoparasites and microbes.

---

This application is a division of our application Ser. No. 769,699, filed Oct. 22, 1968, now U.S. Pat. No. 3,652,580, issued Mar. 28, 1972.

The present invention provides compounds of the general formula

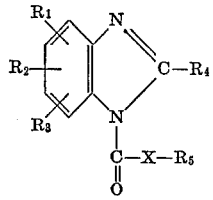

wherein $R_1$, $R_2$ and $R_3$ may be identical or different and each represents hydrogen, halogen, alkyl, alkoxy, alkylthio, alkylSO—, alkylSO$_2$—, —NO$_2$, —CN, CF$_3$, CHO, COOR',

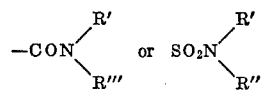

wherein R' and R'' each represents hydrogen or lower alkyl, and $R_4$ represents hydrogen, or an aliphatic or cycloaliphatic residue, X=O, S, —NH— or N-alkyl and $R_5$ represents an aliphatic, araliphatic or aromatic residue.

The present invention also provides a pesticidal preparation which comprises, as active ingredient, at least one compound of the general Formula I given above, together with a suitable carrier.

The preparation may contain one or more of the following additives: a solvent, a dilutent, an emulsifier, a dispersing agent, a thickener, an adhesive as well as other known pesticides.

The active substances defined by Formula I possess various interesting biocidal properties. They not only act as herbicides and defoliants, but at lower concentrations, at which no phytotoxic side effects arise, they show a strong lethal action on various representatives of the order acarina (ticks, spider mites and the like), insects and soil insects, their eggs and larvae, storage pests, for example cockroaches, snails and their eggs, nematodes, plant-pathogenic and human-pathogenic fungi, bacterial and viruses, animal-pathogenic and human pathogenic worms and spirochetes.

The symbol $R_4$ in the general formula of this invention is defined as hydrogen or an aliphatic or cycloaliphatic residue. The aliphatic residue may be saturated or unsaturated and preferably represents a lower alkyl residue; it may furthermore be interrupted by O, S, SO, SO$_2$ and the like, and may optionally also contain cyano, carboxamido or carbalkoxy groups. Perhalogenated aliphatic residues are excluded by this definition. Possible cycloaliphatic residues are, above all, cycloalkyl residues for example, the cyclopropyl, cyclobutyl, cyclopentyl or cyclohexyl residue.

$R_5$ in the general formula in this invention is defined as an aliphatic, araliphatic or aromatic residue; the aromatic residue, preferably phenyl, may be substituted in the most diverse manner, for example, by halogen atoms, or alkyl, alkoxy or alkylthio residues, or by the groups —NO$_2$, —CN, CF$_3$ and the like. If $R_5$ is an aliphatic residue, it may be interrupted by O or S, and preferably represents lower alkyl residues.

Examples of compounds in accordance with the invention, are compounds of formula:

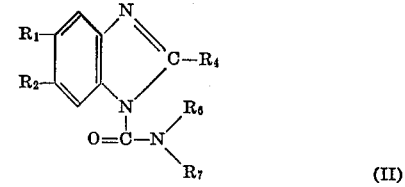

which have an especially good herbicidal action. In this formula $R_1$, $R_2$ and $R_4$ have the significance mentioned above, with $R_1$ and $R_2$ preferably representing hydrogen, lower alkyl, halogen alkyl or NO$_2$ and $R_4$ representing hydrogen, lower alkyl or cycloalkyl; $R_6$ represents hydrogen or lower alkyl and $R_7$ represents lower alkyl, phenyl, alkylphenyl or halogenalkylphenyl.

| $R_1$ | $R_2$ | $R_4$ | $R_6$ | $R_7$ |
|---|---|---|---|---|
| H | H | H | CH$_3$ | CH$_3$ |
| H | H | CH$_3$ | CH$_3$ | CH$_3$ |
| H | H | Cyclopropyl | H | CH$_3$ |
| H | H | Cyclopropyl | CH$_3$ | CH$_3$ |
| H | H | C$_2$H$_5$ | H | CH$_3$ |
| H | H | C$_2$H$_5$ | CH$_3$ | CH$_3$ |
| H | H | C$_3$H$_7$ | H | CH$_3$ |
| H | H | C$_3$H$_7$ | CH$_3$ | CH$_3$ |
| Cl | H | H | CH$_3$ | CH$_3$ |
| Cl | H | CH$_3$ | H | CH$_3$ |
| Cl | H | CH$_3$ | CH$_3$ | CH$_3$ |
| Cl | H | Cyclopropyl | H | CH$_3$ |
| Cl | H | Cyclopropyl | CH$_3$ | CH$_3$ |
| Cl | H | C$_2$H$_5$ | H | CH$_3$ |
| Cl | H | C$_2$H$_5$ | CH$_3$ | CH$_3$ |
| Cl | H | C$_3$H$_7$ | H | CH$_3$ |
| Cl | H | C$_3$H$_7$ | CH$_3$ | CH$_3$ |
| Cl | H | CH$_3$ | H | C$_6$H$_5$ |
| Cl | Cl | CH$_3$ | H | CH$_3$ |
| Cl | Cl | CH$_3$ | CH$_3$ | CH$_3$ |
| NO$_2$ | H | H | CH$_3$ | CH$_3$ |
| NO$_2$ | H | CH$_3$ | CH$_3$ | CH$_3$ |
| NO$_2$ | H | Cyclopropyl | H | CH$_3$ |
| NO$_2$ | H | Cyclopropyl | CH$_3$ | CH$_3$ |

TABLE—Continued

| R₁ | R₂ | R₄ | R₆ | R₇ |
|---|---|---|---|---|
| NO₂ | H | C₂H₅ | H | CH₃ |
| NO₂ | H | C₂H₅ | CH₃ | CH₃ |
| NO₂ | H | C₃H₇ | H | CH₃ |
| NO₂ | H | C₃H₇ | CH₃ | CH₃ |
| NO₂ | H | CH₃ | H | C₆H₅ |
| CF₃ | H | H | CH₃ | CH₃ |
| CF₃ | H | CH₃ | H | CH₃ |
| CF₃ | H | CH₃ | CH₃ | CH₃ |
| CF₃ | H | C₂H₅ | H | CH₃ |
| CF₃ | H | C₂H₅ | CH₃ | CH₃ |
| CF₃ | H | C₃H₇ | H | CH₃ |
| CF₃ | H | C₃H₇ | CH₃ | CH₃ |
| CF₃ | H | CH₃ | H | C₆H₅ |
| CH₃ | H | H | CH₃ | CH₃ |
| CH₃ | H | CH₃ | H | CH₃ |
| CH₃ | H | CH₃ | CH₃ | CH₃ |
| CH₃ | H | Cyclopropyl | H | CH₃ |
| CH₃ | H | Cyclopropyl | CH₃ | CH₃ |
| CH₃ | H | C₂H₅ | H | CH₃ |
| CH₃ | H | C₂H₅ | CH₃ | CH₃ |
| CH₃ | H | C₃H₇ | H | CH₃ |
| CH₃ | H | C₃H₇ | CH₃ | CH₃ |
| CH₃ | H | CH₃ | H | C₆H₅ |

The compounds, for example of formula

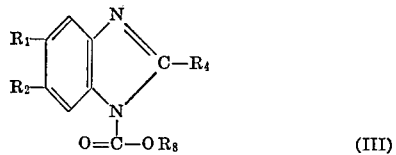

$$O=C-OR_8 \quad (III)$$

are especially distinguished by their herbicidal, fungicidal and ovicidal action. In this formula R₁, R₂ and R₄ have the significance mentioned, with R₁, R₂ and R₄ preferably having the definitions given for Formula II, and wherein R₈ represents a lower alkyl, phenyl, halogenophenyl, nitrophenyl, lower alkylphenyl or benzyl residue.

| R₁ | R₂ | R₄ | R₈ |
|---|---|---|---|
| H | H | H | C₆H₅ |
| H | H | H | C₆H₃Cl₂(3,4) |
| H | H | H | C₆H₄CH₃(m) |
| H | H | H | CH₃ |
| H | H | H | C₂H₅ |
| H | H | H | C₃H₇ |
| H | H | CH₃ | CH₃ |
| H | H | CH₃ | C₂H₅ |
| H | H | CH₃ | C₃H₇ |
| Cl | H | H | C₆H₃Cl₂(3,4) |
| Cl | H | H | C₆H₄CH₃(m) |
| Cl | H | H | C₂H₅ |
| Cl | H | H | C₃H₇ |
| Cl | H | CH₃ | C₆H₃Cl₂(3,4) |
| Cl | H | CH₃ | C₆H₄CH₃(m) |
| Cl | H | CH₃ | C₂H₅ |
| Cl | H | CH₃ | C₃H₇ |
| NO₂ | H | H | C₆H₃Cl₂(3,4) |
| NO₂ | H | H | C₆H₄CH₃(m) |
| NO₂ | H | H | C₂H₅ |
| NO₂ | H | H | C₃H₇ |
| NO₂ | H | CH₃ | C₆H₃Cl₂(3,4) |
| NO₂ | H | CH₃ | C₆H₄CH₃(m) |
| NO₂ | H | CH₃ | C₂H₅ |
| CH₃ | H | H | C₆H₃Cl₂(3,4) |
| CH₃ | H | H | C₆H₄CH₃(m) |
| CH₃ | H | H | C₂H₅ |
| CH₃ | H | H | C₃H₇ |
| CH₃ | H | CH₃ | C₆H₃Cl₂(3,4) |
| CH₃ | H | CH₃ | C₆H₄CH₃(m) |
| CH₃ | H | CH₃ | C₂H₅ |
| CH₃ | H | CH₃ | C₃H₇ |
| CF₃ | H | H | C₆H₅ |
| CF₃ | H | H | C₆H₃Cl₂(3,4) |
| CF₃ | H | H | C₆H₄CH₃(m) |
| CF₃ | H | H | CH₃ |
| CF₃ | H | H | C₂H₅ |
| CF₃ | H | H | C₃H₇ |
| CF₃ | H | CH₃ | C₆H₅ |
| CF₃ | H | CH₃ | C₆H₃Cl₂(3,4) |
| CF₃ | H | CH₃ | C₆H₄CH₃(m) |
| CF₃ | H | CH₃ | C₂H₅ |
| CF₃ | H | CH₃ | C₃H₇ |
| H | H | Cyclopropyl | C₆H₅ |
| NO₂ | H | Cyclopropyl | C₆H₅ |
| CH₃ | H | Cyclopropyl | C₆H₅ |
| NO₂ | H | Cyclopropyl | CH₃ |
| CH₃ | H | Cyclopropyl | CH₃ |
| Cl | H | Cyclopropyl | C₆H₅ |
| Cl | H | Cyclopropyl | C₆H₃Cl₂(3,4) |
| Cl | H | Cyclopropyl | C₆H₄CH₃(m) |
| Cl | H | Cyclopropyl | C₂H₅ |
| Cl | H | Cyclopropyl | C₃H₇(n) |
| Cl | H | Cyclopropyl | C₃H₇(i) |
| Cl | H | Cyclopropyl | C₆H₄NO₂(p) |
| Cl | H | Cyclopropyl | C₄H₉(n) |
| Cl | H | Cyclopropyl | Benzyl |
| Cl | Cl | Cyclopropyl | CH₃ |
| Cl | Cl | Cyclopropyl | C₆H₅ |
| Cl | Cl | Cyclopropyl | Benzyl |

The active substances of Formula I represent benzimidazolylurethanes, -thiolurethanes and -ureas.

They may be manufactured according to the methods usual for the preparation of this class of substances.

As a rule, the procedure followed is to react a benzimidazolyl derivative of formula

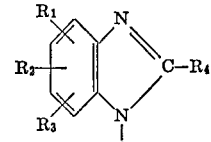

(IV)

with a compound of formula $$BR_5 \quad (V)$$

wherein A and B are groups which are able to form the grouping

whilst undergoing elimination or condensation.

In general, the procedure followed will be to react, in optional sequence, a reactive derivative of carbonic acid or thiocarbonic acid with an imidazole of Formula IV (A=H) and an amine of Formula V (B=NH₂ or NH-alkyl) or an alcohol or phenol of Formula V (B=OH).

Industrially, the procedure followed for the formation of the ureas will be to react an imidazole of Formula IV (A=H) with an isocyanate or a carbamic acid chloride, whilst in the manufacture of urethanes an imidazole of Formula IV is reacted with the desired chlorocarbonate.

The new preparations can be applied in many different forms, for example, in the form of sprays, dusting powders and granules. They can also be worked directly into the soil, optionally together with fertilisers.

Possible materials for the manufacture of directly sprayable solutions of the compounds of general Formula I are, for example: mineral oil fractions of high to medium boiling range, for example, diesel oil or kerosene, coal tar oil and oils of vegetable or animal origin, as well as hydrocarbons, for example, alkylated naphthalenes, or tetrahydronaphthalene, optionally using xylene mixtures, cyclohexanols, ketones, and furthermore chlorinated hydrocarbons, for example, trichlorethane and tetrachlorethane, trichlorethylene or trichlorobenzenes and tetrachlorobenzenes. It is advantageous to use organic solvents having boiling points above 100° C.

It is especially appropriate to prepare aqueous forms for application from emulsion concentrates, pastes or wettable spraying powders by adding water. Possible emulsifiers or dispersing agents are non-ionic products, for example, condensation products of aliphatic alcohols, amines or carboxylic acids having a long-chain hydrocarbon residue of about 10 to 20 carbon atoms with ethylene oxide, for example, the condensation product of octadecyl alcohol and 25 to 30 mols of ethylene oxide or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which may be employed, there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Possible cationic dispersing agents that can be used are quaternary ammonium compounds, for example, cetylpyridinium bromide or dihydroxyethylbenzyldodecylammonium chloride.

In order to manufacture dusting and scattering agents, it is possible to use, as solid carriers: talc, kaolin, bentonite, calcium carbonate, calcium phosphate, also charcoal, cork powder, wood flour and other materials of vegetable origin. It is also advantageous to manufacture the preparations in a granular form. The various forms in which the preparations can be used may, in the usual manner, be provided with additions of substances which improve the distribution, adhesion rain resistance or penetrating power; as such substances fatty acids, resin, glue, casein or alginates may be mentioned.

The preparations according to the invention may be employed by themselves or together with usual pesticides, especially insecticides, acaricides, nematocides, bactericides or further fungicides and/or herbicides.

The following examples illustrate the invention:

EXAMPLE 1

(a) Urea type:

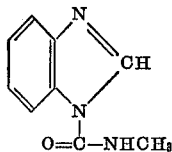

35.5 g. of benzimidazole, 350 ml. of acetonitrile and 150 ml. of dimethylformamide were initially introduced into a 3-necked sulphonation flask. The flask was externally cooled in ice and the stirred solution was mixed with 17.5 g. of methyl isocyanate at 0–5°. The reaction mixture was thoroughly stirred for 5 hours and thereafter mixed with 50 g. of ice. The product crystallised in druses and was filtered off and dried.

Yield: 49.5 g.=94%
Melting point: 94–96° (Compound No. 1).

(b) Urethane type:

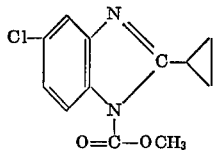

38.6 g. of 2-cyclopropyl-5(6)-chlorobenzimidazole are dissolved in 210 ml. of chloroform in a three-necked flask. After adding 5 g. of magnesium oxide and 70 ml. of water, 22 g. of methyl chloroformate are added drop by drop at 10–15° C., while stirring well. When the reaction has subsided, the mixture is stirred for a further ½ hour, after which the organic phase is separated off in a separating funnel, washed with 25 ml. of water and dried over sodium sulphate. The solvent is distilled off, and the residue recrystallised from acetone/water. Melting point: 57°–61° (compound No. 2).

The following compounds were also manufactured in an analogous manner:

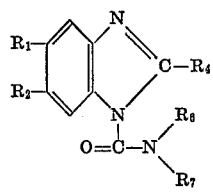

| Number | $R_1$ | $R_2$ | $R_4$ | $R_6$ | $R_7$ | Melting point, °C. |
|---|---|---|---|---|---|---|
| 3 | H | H | $CH_3$ | H | $CH_3$ | 164–167 |
| 4 | H | H | $CH_3$ | H | $C_6H_5$ | 124–126 |
| 5 | H | H | $CH_3$ | H | $C_6H_4CF_3(m)$ | 130–139 |
| 6 | $NO_2$ | H | H | H | $CH_3$ | 143–145 |
| 7 | $NO_2$ | H | $CH_3$ | H | $CH_3$ | 215–217 |
| 8 | $NO_2$ | H | H | H | $C_6H_5$ | 179–181 |
| 9 | $CF_3$ | H | $CH_3$ | H | $CH_3$ | 143–149 |
| 10 | $CH_3$ | $CH_3$ | H | H | $CH_3$ | 144–146 |

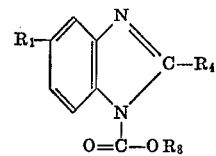

| Number | $R_1$ | $R_4$ | $R_8$ | Melting point, °C. |
|---|---|---|---|---|
| 11 | H | $CH_3$ | $C_6H_5$ | 103–105 |
| 12 | H | $CH_3$ | $C_6H_3Cl_2(3,4)$ | 124–127 |
| 13 | H | $CH_3$ | $C_6H_4CH_3(m)$ | 115–117 |
| 14 | H | $CH_3$ | $C_6H_4NO_2(p)$ | 153–157 |
| 15 | H | $CH_3$ | Benzyl | 80–81 |
| 16 | H | $CH_3$ | $C_4H_9(n)$ | 38–40 |
| 17 | Cl | H | $C_6H_5$ | 80–88 |
| 18 | Cl | H | $CH_3$ | 90–95 |
| 19 | Cl | $CH_3$ | $C_6H_5$ | 80–93 |
| 20 | Cl | $CH_3$ | $CH_3$ | 48–55 |
| 21 | Cl | $C_3H_7(n)$ | $C_6H_5$ | 100–101 |
| 22 | Cl | $C_3H_7(n)$ | $C_3H_7(i)$ | Oil |
| 23 | Cl | $C_3H_7(n)$ | $CH_3$ | 80–85 |
| 24 | $-NO_2$ | H | $C_6H_5$ | 95–105 |
| 25 | $-NO_2$ | H | $CH_3$ | 119–125 |
| 26 | $NO_2$ | $CH_3$ | $C_6H_5$ | 127–132 |
| 27 | $NO_2$ | $CH_3$ | $CH_3$ | 137–142 |
| 28 | $CH_3$ | H | $C_6H_5$ | Oil |
| 29 | $CH_3$ | H | $CH_3$ | Oil |
| 30 | $CH_3$ | $CH_3$ | $C_6H_5$ | 90–99 |
| 31 | $CH_3$ | $CH_3$ | $CH_3$ | Oil |
| 32 | $CF_3$ | $CH_3$ | $CH_3$ | 86–90 |
| 33 | Cl | Cyclopropyl | $C_6H_5$ | 87–88 |
| 34 | H | Cyclopropyl | $CH_3$ | 38–40 |
| 35 | Cl | Cyclopropyl | $CH_3$ | 57–61 |

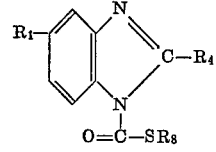

| Number | $R_1$ | $R_4$ | $R_8$ | Melting point, °C. |
|---|---|---|---|---|
| 36 | Cl | Cyclopropyl | $C_6H_5$ | Oil |
| 37 | H | H | $C_6H_5$ | 117–123 |
| 38 | H | H | $CH_3$ | 80–84 |

EXAMPLE 2

A 20% strength wetting powder is manufactured from compound No. 1 in the following manner:

20 g. of active substance are very finely ground in a pin mill together with 8 g. of fine precipitated silicon dioxide (commercially available under the name Zeosil) as well as with 64 g. of bolus alba, 5.6 g. of a condensation product of 1 mol of p-tert. octylphenol with about 8 mols of ethylene oxide and 2.4 g. of sodium 2-heptadecyl-1-benzylimidazole-di-sulphonate. The powder thus obtained can be worked up with water in any desired amount, to give stable dispersions.

EXAMPLE 3

Compound No. 10 was applied in the post-emergence process to the test plants listed below using an amount of 2 kg. of active substance/ha. The application took place 12 days after sowing the test plants, when these had developed 1 to 2 genuine leaves.

Digitaria ---- 6
Beta ---- 9
Chrysanthemum ---- 9
Linum ---- 9
Brassica ---- 9
Stellaria ---- 9
Amaranthus ---- 6
Soya ---- 2
Cotton ---- 2

1=plant undamaged
>5=plant no longer viable
9=plant killed.

EXAMPLE 4

The urethanes listed in Example 1 showed a good action against weeds in the pre-emergence and in the post-emergence process.

The following results were achieved for compounds Nos. 33 and 35:

| Plant | Pre-emergence | | | | Post-emergence | | | |
|---|---|---|---|---|---|---|---|---|
| | No. 35 | | No. 33 | | No. 35 | | No. 33 | |
| | 10 kg. | 5 kg. | 10 kg. | 5 kg. | 5 kg. | 2 kg. | 5 kg. | 2 kg. |
| Avena | 9 | 6 | 7 | 5 | 5 | 4 | 5 | 2 |
| Setaria | 9 | 6 | 9 | 7 | 5 | 3 | 8 | 4 |
| Sinapis | 9 | 9 | 9 | 9 | 9 | 9 | 9 | 9 |
| Lepidium | 9 | 9 | 9 | 8 | 9 | 9 | 9 | 9 |

NOTE.—1=no damage; >5=plant no longer viable; 9=plant completely dead.

EXAMPLE 5

Compound No. 23 was tested for its action against powdery mildew fungi. Courgette plants (*Cucurbita pepo* L.) were grown in a greenhouse and sprayed once prophylactically with an aqueous broth of the compound containing increasing quantities of active substance. Two days after the treatment, the plants were infected with spores of *Erysiphe cichoracearum* DC, and after 12–14 days the plants were rated as regards fungal attack.

Hereupon, a lower inhibitory concentration of 30 p.p.m. of active substance was found.

What is claimed is:
1. A benzimidazole compound of the formula

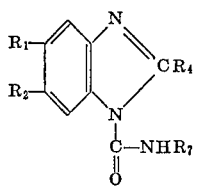

wherein $R_1$ is lower alkyl, trifluoromethyl or nitro; each of $R_2$ and $R_4$ is hydrogen or lower alkyl; and $R_7$ is lower alkyl or trifluoromethylphenyl.

2. The compound of the formula

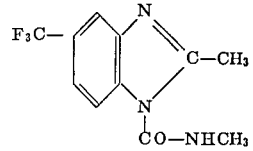

3. The compound of the formula

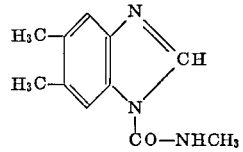

References Cited

Henry et al.: J. Amer. Chem. Soc., vol. 71, pp. 2297–2300 (1949).

Chemical Abstracts, seventh collective index, vols. 56–65, 1962–1966, p. 2924s (1969).

NATALIE TROUSOF, Primary Examiner